G. L. BALLARD.

CIRCULAR KNITTING MACHINE.

APPLICATION FILED NOV. 30, 1915.

Reissued Mar. 28, 1916.

14,092.

2 SHEETS—SHEET 1.

*Inventor:*

*George L. Ballard,*

*by Spear, Middleton, Donaldson & Spear*

*Atty's.*

G. L. BALLARD.

CIRCULAR KNITTING MACHINE.

APPLICATION FILED NOV. 30, 1915.

Reissued Mar. 28, 1916.

14,092.

2 SHEETS—SHEET 2.

*Inventor:*

*George L. Ballard.*

*by Spear, Middleton, Donaldson & Spear, Atty's.*

UNITED STATES PATENT OFFICE.

GEORGE LAWSON BALLARD, OF NORRISTOWN, PENNSYLVANIA, ASSIGNOR TO WILDMAN MFG. CO., A CORPORATION OF PENNSYLVANIA.

CIRCULAR-KNITTING MACHINE.

14,092. Specification of Reissued Letters Patent. Reissued Mar. 28, 1916.

Original No. 1,140,790, dated May 25, 1915, Serial No. 840,379. Application for reissue filed November 30, 1915. Serial No. 64,346.

*To all whom it may concern:*

Be it known that I, GEORGE LAWSON BALLARD, a subject of the King of Great Britain, residing at Norristown, Montgomery county, Pennsylvania, have invented a new and useful Improvement in Circular-Knitting Machines, of which the following is a specification.

This invention comprises an improvement on the dogless type of circular knitting machine disclosed in Letters Patent of the United States granted to me December 26, 1911, #1,012,966.

My present invention concerns among other features a fixed frame support for the dial instead of a support derived from the rotary yoke shown in said patent which rotates with the cam ring, my object here being to sustain the dial by a fixed frame piece or bracket entirely independent of any supporting or sustaining connection with the rotary cam ring or carrier in order that the dial may be maintained in a certain fixed relation to the fixed cylinder and will not be affected in such relation because of any looseness, side shake or play of the rotary cam ring due to wear.

In connection with this fixed frame or bracket for sustaining and maintaining the dial in active relation to the fixed cylinder, I employ driving means for the dial cap or cam plate and for the yarn carrier or bobbin stand, which driving means is connected with the rotary cam carrier or box, this connection being such that the dial cap or cam and the yarn guide carrier will not be unduly affected by any irregularities in the movement of the cylinder cam ring due to wear.

Other objects of my invention will appear hereinafter.

The invention consists in the features and combination and arrangement of parts hereinafter described and particularly pointed out in the appended claims.

Figure 1:
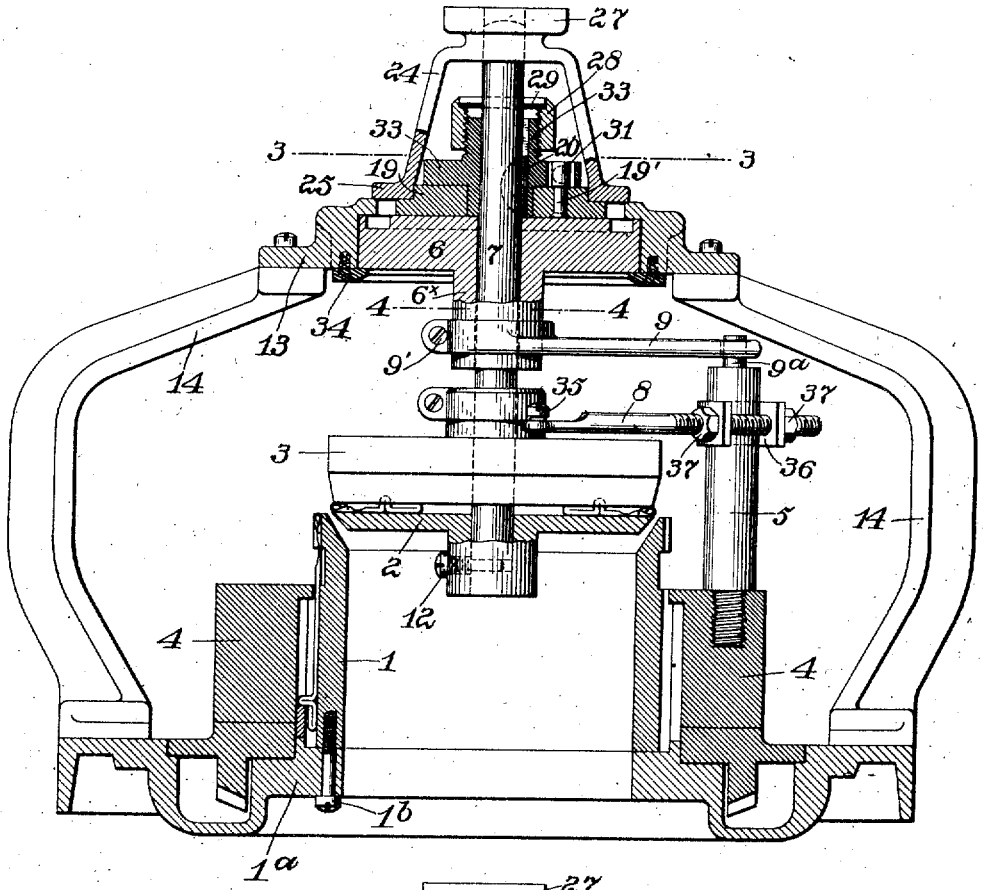
Figure 2:
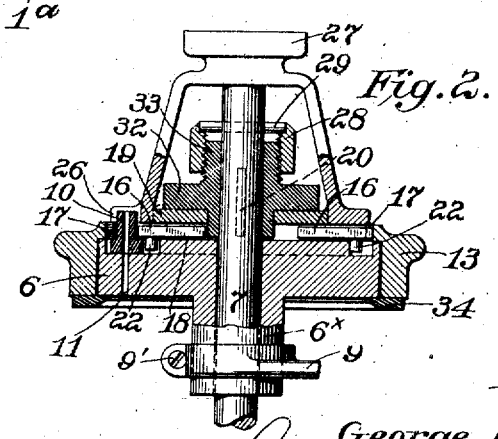
Figure 3:
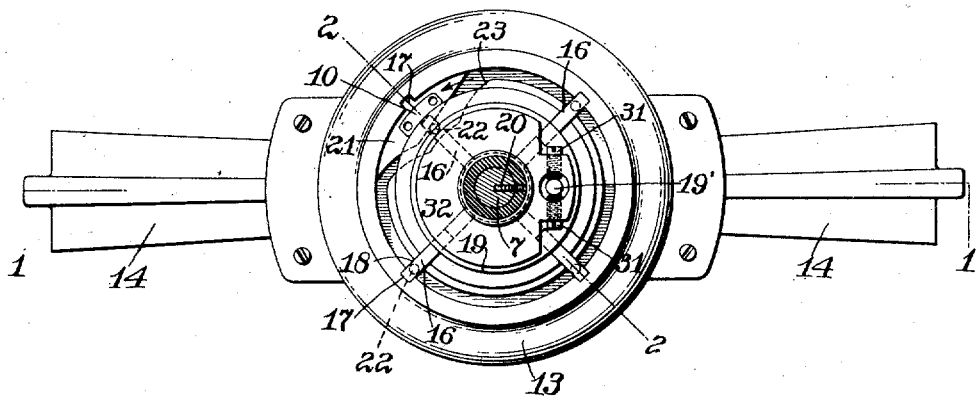
Figure 4:
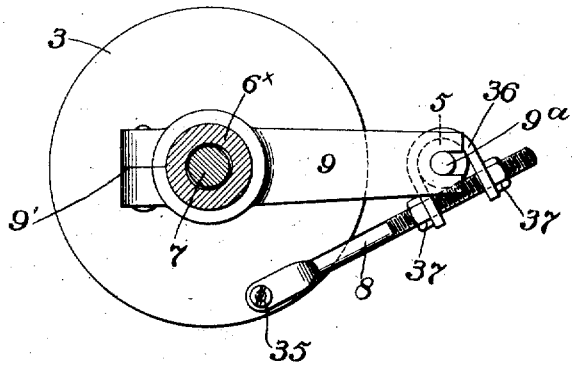

In the accompanying drawings, Figure 1 is a central vertical sectional view of a knitting machine head with my invention connected therewith, the section of this view being taken substantially on the line 1—1 of Fig. 3, parts being shown in elevation; Fig. 2 is a sectional view similar to the upper part of Fig. 1, but substantially on the line 2—2 of Fig. 3; Fig. 3 is a plan view substantially on the line 3—3 of Fig. 1, with the bobbin stand omitted; Fig. 4 is a plan view of a section substantially on the line 4—4 of Fig. 1.

In these drawings, 1 indicates the needle cylinder which is fixed as in ordinary practice to the main base ring $1^a$ of the knitting head by screws $1^b$.

2 indicates the dial, and 3 the dial cap or cam carrier, and 4 indicates the cylinder cam or cam ring. Connected with this cylinder ring is a post 5, and a connection extends from this post to the dial cap 3 consisting of a rod or link 8 so that the dial cap will be rotated with the cylinder cam ring, and this connection I will refer to later.

In a machine of this character the thread guides must rotate, and for this purpose a rotary ring or plate 6 is employed, this rotating about the dial post 7, and for driving this ring or plate 6 a rod 9 is employed having a forked end engaging a pin $9^a$ at the top of the post 5. The rod 9 has a collar at its inner end which is clamped at 9′ to a depending sleeve $6^x$ of the rotary plate or ring 6. This rotary plate has fixed thereto the thread guides or eyes 10, and it has thread guide openings 11 in alinement with the guide openings through the eyes 10. The dial post 7 extends as usual down through the dial cap, and is connected with the dial or a sleeve extension thereof by a pin 12. For supporting the rotary plate 6 and also for holding the dial post 7 against rotation, a frame ring 13 is employed surrounding the dial post and supported by brackets or arms 14, one or more, secured to and extending up from the fixed base ring $1^a$.

16 indicates locking bolts which slide in grooves 18 of a cap 19 which is fixed to the dial post as will hereinafter be described. The bolts 16 slide radially and are adapted, when projected, to enter notches 17 in the frame ring 13, and when in this position they perform their function of connecting the cap 19 to the frame ring 13, so as to hold said cap against rotation, and as the cap is connected as above mentioned rigidly to the dial post, the dial post will be held against rotation. In order to allow for the rotation of the thread guides 10 which, as above described, are fixed to and rotate with the plate or ring 6, the locking bolts 16 are retracted in succession to allow the thread guides or eyes to pass by, and for this purpose the said locking bolts are provided with depending pins 22 and the rotary ring or plate 6 is provided with a retracting cam 21 so that, as shown in Fig. 3, as the thread guide, together with the plate 6, rotates in the direction of the arrow, Fig. 3, the cam 21 will act upon the depending pin 22 and retract the sliding bolt to allow for the passage of the thread guide or eye, as shown in Fig. 3. A returning or advancing cam is shown at 23 for projecting the bolt outwardly as soon as the thread eye has passed the bolt, this cam acting upon the inner side of the pin 22. In this way each bolt 16 is retracted or moved radially inward as the thread guide approaches it, and after the thread guide passes this bolt is projected outwardly. In other words, the series of bolts, of which I have shown four in the present case, are retracted in succession, but the arrangement is such that some of the bolts are always outward in their locking position, thus serving to hold the cap plate 19 against rotation and consequently the dial post is held against movement.

Fig. 3 shows a one-feed machine, there being two thread eyes, however, at the thread carrier 10. The machine may be equipped with a plurality of thread guides, if desired, in which case there would be cams 21 and 23 for each guide, but in any case there would be more locking bolts than thread guides so that some of the bolts would always be in projected position to hold the dial post against rotation.

The cap plate 19 is connected with the dial post by a pin 19′ extending up therefrom which is borne upon by adjusting screws 31 on each side of the pin, these adjusting screws being carried by a collar 32 surrounding the dial post, which collar, in turn, is keyed at 20 to the dial post. For adjusting the dial vertically, the collar 32 has a screw-threaded extension 33 upon which a nut 28 is screwed, said nut having a recess receiving a pin 29 extending through the dial post 7. The rotary plate 6 is supported by resting upon a ring 34 secured to the under side of the fixed frame ring 13, and extending inwardly under the edge of the said plate 6. It will be seen from the above that the dial post is rigidly supported and rigidly held against any lateral deflection by its connection with the fixed base 1ᵃ, through the intermediary of the arms 14, the fixed frame ring 13, and the rotary member 6; the bolts 16, the cap piece 19, and the connection from this cap piece to the dial post which includes the key 20, collar 32, and pin 19′, serving to hold the dial support against circumferential movement in relation to the needle cylinder and contributing to holding the dial post against lateral deflection. The rigid frame ring also holds the ring or plate 6 and dial post against tipping, said ring 13 with its ring 34 furnishing a bearing for all sides of the rotary member 6. Substantially all parts, with the exception of the driving connection 5—8—9, are supported by these rigid frame parts consisting of the ring 13 and standards 14.

As before stated, the ring 6 is driven from the post 5 on the cam ring by the link or rod 9 having a forked end engaging the pin 9ᵃ at the top of the post 5. Because of this forked construction any irregular movement of the cam ring due to wear will not be imparted to the plate 6 in such manner as to tend to affect the axial position of the dial post 7, both because of the fact that the pin 9ᵃ engages the fork and can have movement therein, and also because of the rigid supporting frame above described which holds the rotary member 6 against displacement. Any wavering or lateral play of the cam ring 4 will be taken up by the loose connection between the pin 9ᵃ and the driving arm 9.

In order to secure adjustment for indexing, or in other words, for adjusting the dial circumferentially in relation to the cylinder to properly space the needles, the screws 31 are provided bearing on opposite sides of the pin 19′, and as these screws are in the part or collar 32 which is directly keyed to the dial post, and as the pin 19′ is carried by the cap 19, which is connected through the sliding bolts 16 with the rigid frame ring 13, by adjusting the screws 31, the dial post can be turned in relation to the fixed frame and consequently the dial carried thereby can be adjusted circumferentially in relation to the fixed cylinder, and thus proper indexing of the needles may be secured.

Referring to the connection 8 for rotating the dial cap 3, the rod 8 for this purpose is connected with the dial cap by the screw 35. This rod is held to the driving post 5 by a clip 36, the rod being screw-threaded and passing through the clip, nuts 37 being provided to hold the rod in the clip. This construction provides for adjustment, and the tightening up of the nuts to secure the proper adjustment serves to clamp the clip to the driving post. It will be observed that the connection 8 extends nearly tangential in relation to the dial cap, and because of this any wavering of the post 5 due to irregular movements of the rotary cam ring because of play or wear of said ring will not unduly affect the position of the dial cap 3, and will not bring strain or pressure upon the dial post, because should the connection 8 have slight longitudinal movement due to wavering of the driving post 5, the only effect of this would be to turn the dial circumferentially about the post, but the post would not be pressed laterally, and there would be no strain on the parts.

The connections 9 and 8 for rotating the thread guide plate 6 and the dial cam or cap are both in the nature of loose or compensating connections in the sense that both provide for wavering of the cylinder cam ring without affecting the proper relation of the dial and cylinder.

It will be observed that the dial post is sustained against vertical displacement by the pin 29 resting on the nut 28 attached to the collar 32 which rests upon and is centered in the cap plate 19 which, in turn, rests upon the thread guide plate 6 and the latter in turn rests upon the ring 34 attached to the fixed frame ring 13. This frame ring therefore is the element which supports the dial post and dial entirely independent of the rotary cam ring and against vertical displacement, and also against circumferential displacement by reason of the radially disposed sliding bolts engaging the fixed frame ring.

I show at 27 a bobbin stand, the arms 24 or shell of which has feet or flange portions 25 notched at 26, to fit over the yarn guides 10 to be held in position thereby. This bobbin stand is engaged by the dial post at its upper end and the arrangement is such that the ring 13 and the rotary member 6 serve to prevent wabbling of the bobbin stand and thereby prevent the dial post from being displaced from its central position, which otherwise might occur.

I claim as my invention:—

1. In combination in a circular rib knitting machine, a fixed needle cylinder, a needle dial, a frame member above the dial, held against displacement in all directions, a dial support open for the passage of the yarn and rotatably mounted within the fixed frame member and held thereby against displacement in all directions, a dial cam carrier, a cylinder cam carrier free from the weight of the dial, means for rotating said dial cam and dial support and means for holding the needle dial against circumferential movement in relation to the needle cylinder, substantially as described.

2. In combination in a circular rib knitting machine, a fixed cylinder, a dial, revolving cylinder and dial cam carriers, a supporting member above the dial connected with the fixed frame and held thereby rigidly against displacement in all directions, means for supporting the weight of the dial from said rigid supporting member independently of the cylinder cam carrier, means for holding the dial against circumferential displacement in relation to the cylinder, and a driving connection for said dial cam carrier unaffected by irregularities in the movement of the cylinder cam carrier, substantially as described.

3. In combination in a circular rib knitting machine, a non-rotary cylinder and dial, revolving cylinder and dial cam carriers, a frame member above the dial held against movement in all directions, a supporting member above the dial rotatably connected with the fixed frame and held rigidly thereby against displacement in all directions, means for supporting the dial from said rigid supporting member independently of the cylinder cam carrier and against vertical or lateral displacement and a driving connection for the dial cam carrier, substantially as described.

4. In combination in a circular rib knitting machine, a fixed cylinder, a dial, revolving cylinder and dial cam carriers, dial supporting means above the said dial connected with the fixed frame and held thereby against displacement in all directions, means for supporting the weight of the dial from said rigid supporting means independently of the cylinder cam carrier and comprising means rotating in connection with said rigid supporting means and open for the passage of the yarn, means for holding the dial against circumferential displacement in relation to the cylinder, and driving means for the dial cam carrier unaffected by any irregularities in the movement of the rotary cylinder cam carrier, substantially as described.

5. In combination in a circular rib knitting machine, a non-rotary cylinder and dial, a rigid support above the dial connected with the fixed frame, means associated with said rigid support for holding the said dial against displacement in relation to the cylinder, a cylinder cam carrier, a dial cam carrier, and driving means between the cylinder cam carrier and dial cam carrier compensating for any irregularities in the movement of the cylinder cam carrier, said holding means including a rotating member moving in unison with the dial cam and open for the passage of the yarn, substantially as described.

6. In combination in a circular knitting machine, a fixed cylinder, a cylinder cam ring, a dial, a dial cap carrying cams, a dial post, a frame ring, means for supporting said frame ring immovably from the fixed frame against vertical lateral or circumferential displacement and independent of the cylinder cam ring, a plurality of shiftable connections between said frame ring and the dial post, a rotary thread guide plate also supported by the said frame ring against vertical displacement, and independently of the cylinder cam ring, driving means for the rotary thread plate and the dial cam cap extending from the cylinder cam ring, said dial post being sustained by said thread-guide plate and frame ring against vertical displacement, uninfluenced by the said driving connection with the cylinder cam ring and cam means carried by the rotary thread guide plate for operating the shiftable connections, said frame ring sustaining the weight of the rotary thread plate, the dial and dial cam and relieving the cylinder cam ring of this weight, substantially as described.

7. In combination in a circular knitting machine, a fixed needle cylinder, a dial, a dial cam carrier, a dial post, a cylinder cam ring, a frame ring, supporting means extending to the fixed frame for holding said ring against vertical and circumferential displacement, said supporting means comprising a yoke connected with the frame at separated points, a connection between said frame ring and the dial post for holding the same against rotation, a rotary thread guide plate sustained by the frame ring and in turn sustaining the weight of the dial post and dial, and driving means between the rotary thread guide plate and dial cam carrier and the cylinder cam ring, substantially as described.

8. In combination in a circular knitting machine, a fixed needle cylinder, a dial, a dial cam carrier, a dial post, a cylinder cam ring, a frame ring, supporting means extending to the fixed frame for holding said ring against vertical and circumferential displacement, a connection between said frame ring and the dial post for holding the same against rotation, a rotary thread guide plate, supported on the fixed frame ring and in turn holding the dial post against vertical displacement and driving means between the rotary thread guide plate and dial cam carrier and the cylinder cam ring, said driving means compensating for any irregularities in the movement of the rotary cylinder cam ring, substantially as described.

9. In combination in a circular knitting machine, a fixed needle cylinder, a rotary cylinder cam ring, a dial, and dial post, a dial cam cap, a frame ring, a support extending therefrom to the fixed frame of the machine for holding the frame ring against circumferential and vertical displacement, a connection between said frame ring and the dial post for holding the same against rotation, a rotary thread guide plate within the frame ring, held thereby against vertical movement and sustaining the weight of the dial, a compensating connection between the thread guide plate and the cylinder cam ring, and a second compensating connection between the dial cam cap and the said cylinder cam ring, substantially as described.

10. In combination in a circular knitting machine, a fixed needle cylinder, a rotary cam ring therefor, a dial and dial post, a dial cam cap, a rotary thread guide plate, a frame ring within which said thread guide plate rotates and is supported against vertical displacement, supporting means between the frame ring and the fixed frame of the machine for holding the frame ring against vertical and circumferential displacement, a cap piece above the thread guide plate fixed to the dial post, radially movable locking means between the fixed frame ring and the cap piece, a cam on the thread guide plate for retracting said locking means in succession for the passage of the thread guide, and compensating driving means between the thread guide plate and the dial cam cap and the revolving cylinder cam ring, substantially as described.

11. In combination in a circular knitting machine, a fixed needle cylinder, a rotary cam ring therefor, a dial, a dial post, a dial cam cap, a fixed ring, locking connections between the fixed ring and the dial post for holding the dial post against rotation, a supporting connection between the fixed ring and the fixed frame of the machine for holding said ring against displacement vertically and circumferentially, a thread guide plate rotating within the fixed ring and supported thereby against vertical displacement, said thread guide plate sustaining the dial post against vertical displacement, cam means on the rotary thread guide plate for operating the locking connections between the fixed ring and the dial post, a post extending up from the cylinder cam ring, a radially extending arm connected with the rotary thread guide plate and having a loose connection with the post of the rotary cylinder cam ring, and means for rotating the dial cam cap in unison with the rotary thread guide plate and the cylinder cam ring, substantially as described.

12. In combination in a circular knitting machine, a fixed cylinder, a dial and dial cam cap, a fixed frame member with means for supporting the dial therefrom against vertical or lateral displacement, said frame sustaining the weight of the dial independent of the cylinder cam ring, a rotary cam ring for the needle cylinder free from the weight of the dial, a post extending up from said cam ring, and a compensating connection between the said post and the dial cam cap to compensate for irregularities in the movement of the rotary cam ring, substantially as described.

13. In combination in a circular knitting machine, a fixed cylinder, a dial and dial cam cap, a fixed frame member rotatable means supported by said fixed frame member for supporting the dial against vertical or lateral displacement, a rotary cam ring for the needle cylinder free from the weight of the dial, a post extending up therefrom, and a loose connection between the said post and the dial cam cap to compensate for irregularities in the movement of the rotary cam ring, said connection consisting of a rod extending from the post at an inclination to the radii of the dial cam cap, and means for driving the said rotatable means in unison with the dial cam cap, substantially as described.

14. In combination in a circular knitting machine, a fixed cylinder, a needle dial, rotary cylinder and dial cams, a frame member above the dial having connection with the fixed frame holding it against movement in all directions, a rotatable dial support mounted in connection with the fixed frame member and held thereby against displacement in all directions, a rotatable bobbin stand above the said rotatable dial support and connected therewith to be rotated thereby, said fixed frame member sustaining the weight of the dial with its rotatable support and overhead bobbin stand and relieving the cylinder cam carrier of the weight of said parts, said dial support being open for the passage of the yarn, means for rotating the dial cam and dial support and means for holding the needle dial against circumferential movement in relation to the needle cylinder.

15. In combination in a circular knitting machine, a fixed needle cylinder, a rotary cam ring therefor, a dial and dial post, a dial cam cap, a frame ring, means for holding said frame ring against vertical lateral and circumferential displacement, said means extending from the fixed frame of the machine, locking connections between the frame ring and the dial post, a rotary thread guide plate, the weight of which is sustained by the fixed frame ring and in turn sustaining the weight of the dial post, said ring also preventing lateral displacement of the dial, means revolving with the rotary thread guide plate for operating the locking connections, means for adjusting the dial post circumferentially in relation to its locking connections, and a connection for the dial cap and thread guide plate from the cylinder cam ring, said connection being compensating in not transmitting to the ring or dial cap irregularities of the cam ring's movement, substantially as described.

16. In combination in a circular knitting machine, a fixed needle cylinder, a rotary cam ring therefor, a dial, a rotary dial cam cap, a dial post, a fixed frame ring, means for supporting said frame ring against vertical or circumferential displacement, said means extending to the fixed frame of the machine, a cap piece surrounding the dial post, a collar keyed to the dial post, an adjustable connection between the said collar and the cap piece to permit circumferential adjustment of the dial post for indexing, locking connections between the fixed frame ring and the cap piece, a rotary thread guide plate supported against vertical displacement by the fixed frame ring, means on said thread guide plate for operating the locking connections for the passage of the thread guide, and means for driving the dial cap and the rotary thread guide plate from the cylinder cam ring uninfluenced by irregularities of movement thereof, substantially as described.

17. In combination in a circular knitting machine, a needle cylinder and dial, rotary needle cam carriers for each of said parts, a post for supporting one of said parts in fixed relation to the other, a frame ring supported from the fixed frame of the machine against vertical or circumferential displacement and independent of the needle cam carrier, a plurality of shiftable locking connections between said frame ring and the said post, a rotary thread guide plate also supported by the said frame ring against vertical displacement, the weight of said post and the member held thereby being supported by said rotary thread guide plate, and compensating driving means for one of the cam carriers extending from the other cam carrier, the said thread guide plate rotating in unison with the cam carriers, substantially as described.

18. In combination needles, needle cam carriers, a cylinder and dial with a post for supporting one of said parts, a frame ring, supporting means to sustain said frame ring against vertical or circumferential displacement and independent of either carrier as a support therefor, and shiftable connections between said frame ring and the said post to hold it against rotation, said post being supported against vertical displacement from the frame ring, substantially as described.

GEORGE LAWSON BALLARD.

Witnesses:

E. R. Roberts,

Owen Ballard.